June 17, 1941.   R. W. BAILY   2,245,956
METHOD FOR PROTECTING FOODSTUFFS
Filed Sept. 18, 1939

Inventor:
Robert William Baily,
By: Bair & Freeman
Attorneys.

Patented June 17, 1941

2,245,956

UNITED STATES PATENT OFFICE 2,245,956

METHOD FOR PROTECTING FOODSTUFFS

Robert William Baily, Narberth, Pa.

Application September 18, 1939, Serial No. 295,531

1 Claim. (Cl. 43—124)

My invention relates to method for protecting foodstuffs and other materials from attacks by rodents, insects, worms, weevils, birds, animals, and other destructive agents.

It is well known that foodstuffs such as corn, grain and so on, and also other vegetable materials are, when in storage, subject to destruction by the attack of rodents and other animals, by insects, in fact by many members of the animal kingdom. Such materials are also subject to destruction and injury by the attack of fungi or other vegetable parasites.

I have found that when the containers housing such materials are intermittently subjected to vibrations, even though such vibrations be of almost negligible amplitude, the attacks upon the material contained are either totally prevented or rendered economically negligible. I have found that animals and insects so dislike vibrations mechanically created, that they immediately leave and depart from the container and its contents, or refuse to enter the container, when the container is subjected to continuous or intermittent vibrations. I have also found that materials, such as edible grains in a container, are in process of attack by worms, weevils, and so forth, and that when the container and its contents are subjected to vibrations of appropriate amplitude, it causes the death of the worms, weevils, and so forth. I have also found that fungi and other like destructive agents do not thrive when subjected to mechanical vibrations.

My invention comprises apparatus and method for imparting to the container and to the contained material, continuous or intermittent mechanical vibrations in a manner to prevent attack by animals or insects and to halt the propagation of fungi and other like destructive agents.

In the accompanying drawing I have shown the apparatus for employing the method of my invention.

Figure 1:
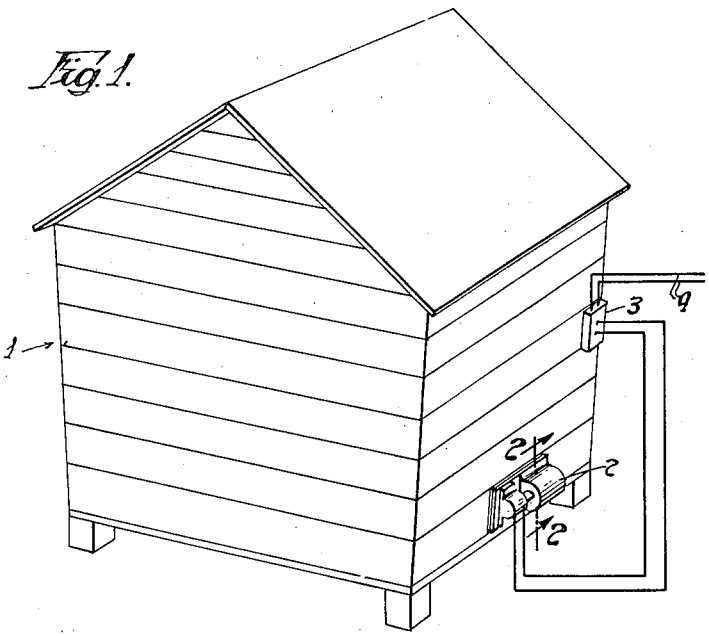
Figure 1 is an elevation perspective drawing of a foodstuff container to which is attached my vibrating apparatus.

In Figure 1 I show the container 1 which may be a crib or other suitable container. I provide the mechanical vibrator 2 attached to the exterior or interior of the container, and for the purposes of the description, I show the interrupter 3 and the source of energy, in this case, electric, 4. The vibrator 2 may be of any desired design to impart vibrations to the container 1 and its contents, and the interrupter 3 may have any desired characteristics of control over the vibrator 2. Any appropriate kind of power to actuate the vibrator 2 may be employed.

The interrupter 3 may be any one of the known types by which a power operated mechanism can be periodically interrupted.

Figure 2:
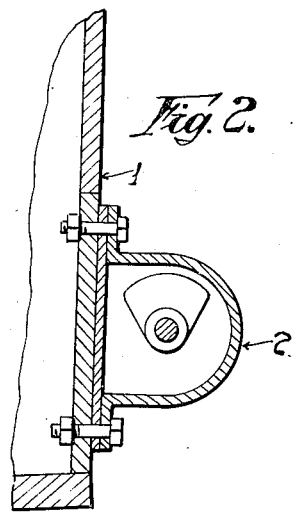
Figure 2 is a vertical cross sectional view of the apparatus 2 of Figure 1.

In Figure 2 I show a vertical cross sectional view of the apparatus 2 of Figure 1.

The vibrator 9 may be of the form shown in my Patent No. 2,148,722.

It will, of course, be understood that the vibrator may be of the electrically driven or any power operated type and the vibrator itself may be such as that mentioned or any other vibrator adaptable for the purpose.

I claim:

The method of defending a dry edible material from attacks by mammals and insects while such material is stored in a container, comprising intermittently imparting mechanical vibrations to the container and the dry material whereby attack on the material by mammals and insects is prevented through the dislike of intermittent vibratory impulses by mammals and insects causing the mammals and insects to remain absent from the material.

ROBERT WILLIAM BAILY.